United States Patent
Mitchell et al.

(10) Patent No.: US 8,651,500 B2
(45) Date of Patent: Feb. 18, 2014

(54) DOLLY TRANSPORT SYSTEMS

(75) Inventors: Prenell Mitchell, Lexington, KY (US); Thomas Darwin Combs, Georgetown, KY (US); William Eric Cook, Lawrenceburg, KY (US); Thomas Josef Butrum, Georgetown, KY (US); Anthony Lee Dunn, Georgetown, KY (US); Bethany Kay Giordano, Georgetown, KY (US); Danny Joe Jackson, Paris, KY (US); Heather Dawn Johnson, Lexington, KY (US); Shirley Mae Devers, Stamping Ground, KY (US); Mark David Rucker, Walton, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 172 days.

(21) Appl. No.: 13/213,498

(22) Filed: Aug. 19, 2011

(65) Prior Publication Data

US 2013/0043663 A1 Feb. 21, 2013

(51) Int. Cl.
*B62B 1/04* (2006.01)

(52) U.S. Cl.
USPC ..................................... 280/47.18; 280/47.27

(58) Field of Classification Search
USPC .................. 280/47.2, 47.18, 47.27, 79.11
See application file for complete search history.

(56) References Cited

U.S. PATENT DOCUMENTS

| | | | | |
|---|---|---|---|---|
| 1,807,913 A * | 6/1931 | Hollowood | ................... | 414/456 |
| 2,700,573 A | 1/1955 | Nordgard | | |
| 2,747,883 A | 5/1956 | Frost | | |
| 3,411,798 A * | 11/1968 | Capadalis | ..................... | 280/5.32 |
| 4,368,896 A * | 1/1983 | Ortega | ......................... | 280/5.24 |
| 4,531,752 A * | 7/1985 | Diener | ...................... | 280/47.18 |
| 4,630,837 A * | 12/1986 | Kazmark | ..................... | 280/47.2 |
| 4,653,765 A | 3/1987 | Smalley et al. | | |
| 4,717,168 A | 1/1988 | Moon, Sr. | | |
| 4,822,066 A * | 4/1989 | Rehrig | ....................... | 280/79.11 |
| 4,858,940 A * | 8/1989 | Cheng | ........................... | 280/5.2 |
| 4,919,442 A | 4/1990 | Green | | |
| 5,160,153 A * | 11/1992 | Zan | .............................. | 280/43.1 |
| 5,207,439 A * | 5/1993 | Mortenson | ................... | 280/47.2 |
| 5,228,716 A * | 7/1993 | Dahl | ............................. | 280/651 |
| 5,244,221 A * | 9/1993 | Ward | .......................... | 280/79.7 |
| 5,277,439 A * | 1/1994 | Pipes et al. | ................... | 280/47.2 |
| 5,294,137 A | 3/1994 | Barber et al. | | |
| 5,445,399 A * | 8/1995 | Salvucci, Sr. | ............. | 280/47.27 |
| 5,465,987 A * | 11/1995 | DellaVecchia | ............ | 280/47.28 |
| 5,518,356 A * | 5/1996 | Krawczyk | ..................... | 414/444 |
| 5,779,251 A * | 7/1998 | Meier | .......................... | 280/47.2 |
| 5,810,373 A * | 9/1998 | Miranda | ...................... | 280/47.2 |
| 5,833,249 A * | 11/1998 | DeMartino | ................... | 280/5.2 |
| 5,921,566 A * | 7/1999 | Kern et al. | ................. | 280/79.11 |
| 5,947,491 A * | 9/1999 | Meier | .......................... | 280/47.2 |
| 6,450,515 B1 * | 9/2002 | Guth | .......................... | 280/79.11 |
| 6,550,794 B1 * | 4/2003 | Spindel et al. | ............. | 280/79.11 |

(Continued)

*Primary Examiner* — Jeffrey J Restifo
(74) *Attorney, Agent, or Firm* — Dinsmore & Shohl, LLP

(57) ABSTRACT

A dolly transport system includes a dolly cart assembly having a dolly frame having at least one gripping handle, at least one lifting fork extending from the dolly frame to a distal end, and a handle grip structure located at the distal end of the lifting fork. The dolly cart assembly includes a first supporting location that includes the gripping handle and a second supporting location remote from the first supporting location that includes the handle grip structure.

20 Claims, 6 Drawing Sheets

(56) References Cited

U.S. PATENT DOCUMENTS

| | | | |
|---|---|---|---|
| 6,857,642 B2 * | 2/2005 | Gruber | 280/33.991 |
| 6,886,787 B2 * | 5/2005 | Stahl | 248/129 |
| 6,974,140 B2 * | 12/2005 | Neuman | 280/79.11 |
| 6,979,005 B1 * | 12/2005 | McLerran | 280/33.998 |
| 7,083,174 B2 | 8/2006 | Kane | |
| 7,104,553 B2 * | 9/2006 | Gruber | 280/33.991 |
| D538,998 S * | 3/2007 | Henry | D34/23 |
| 7,503,571 B2 * | 3/2009 | Cromie | 280/79.11 |
| 7,871,046 B2 * | 1/2011 | Munro et al. | 248/129 |
| 2003/0151218 A1 * | 8/2003 | Swaffield | 280/47.27 |
| 2010/0270763 A1 | 10/2010 | Nassaux et al. | |
| 2013/0043663 A1 * | 2/2013 | Mitchell et al. | 280/47.18 |

* cited by examiner

DOLLY TRANSPORT SYSTEMS

TECHNICAL FIELD

The present disclosure is generally directed to dolly transport systems including dolly cart assemblies for use with support platforms.

BACKGROUND

Hand trucks are used to transport a variety of objects, including objects that are difficult to manually grasp. The hand trucks are generally tilted back along a pair of wheels to support the objects. The wheels along the hand truck allow a user to more easily transport the object without having to directly grasp the object.

Some objects, however, may be too heavy and/or unwieldy to transport using a conventional hand truck. The objects may also have to be transported over obstacles, for example, door thresholds or a series of steps, which may be difficult to navigate using a conventional hand truck. Additionally, precise placement of an object carried by a conventional hand truck may be difficult. Accordingly, dolly transport systems that allow users to easily move cumbersome objects and to navigate over and/or around obstacles are desired.

SUMMARY

In one embodiment, a dolly transport system includes a dolly cart assembly having a dolly frame having at least one gripping handle, at least one lifting fork extending from the dolly frame to a distal end, and a handle grip structure located at the distal end of the lifting fork. The dolly cart assembly includes a first supporting location that includes the gripping handle and a second supporting location remote from the first supporting location that includes the handle grip structure.

In another embodiment, a dolly transport system includes a dolly cart assembly having a dolly frame including at least one gripping handle, a first wheel set located along the dolly frame, where the first wheel set has a first wheel set pivot axis about which the first wheel set pivots. The dolly frame also includes a second wheel set located along the dolly frame, where the second wheel set has a second wheel set pivot axis about which the first wheel set pivots. The first wheel set and the second wheel set contact a ground surface to support the dolly frame in a free-standing, inclined orientation, and the first wheel set pivot axis and the second wheel set pivot axis are located in different horizontal planes when the dolly frame is in a free-standing, upright orientation.

In yet another embodiment, a dolly transport system includes a dolly cart assembly having a dolly frame including at least one gripping handle, at least one lifting fork extending from the dolly frame to a distal end, and a handle grip structure located at a distal end of the lifting fork, where the handle grip structure has a grip receiving structure and an assist rod removably coupled to the grip receiving structure.

BRIEF DESCRIPTION OF THE DRAWINGS

The following detailed description of specific embodiments of the present disclosure can be best understood when read in conjunction with the drawings enclosed herewith.

DETAILED DESCRIPTION

Embodiments described herein relate to dolly transport systems having first supporting locations, second supporting locations, and load supporting regions located between the first supporting locations and the second supporting locations. The first and second supporting locations allow multiple users to grip the dolly transport systems at different sides of the load supporting regions as to apply force in combination with one another to manipulate the dolly transport systems. Additionally, the dolly transport systems may include first wheel sets and second wheel sets located along dolly frames wherein the first and second wheel sets contact a ground surface to support the dolly transport system in a free-standing, inclined orientation.

Figure 1:
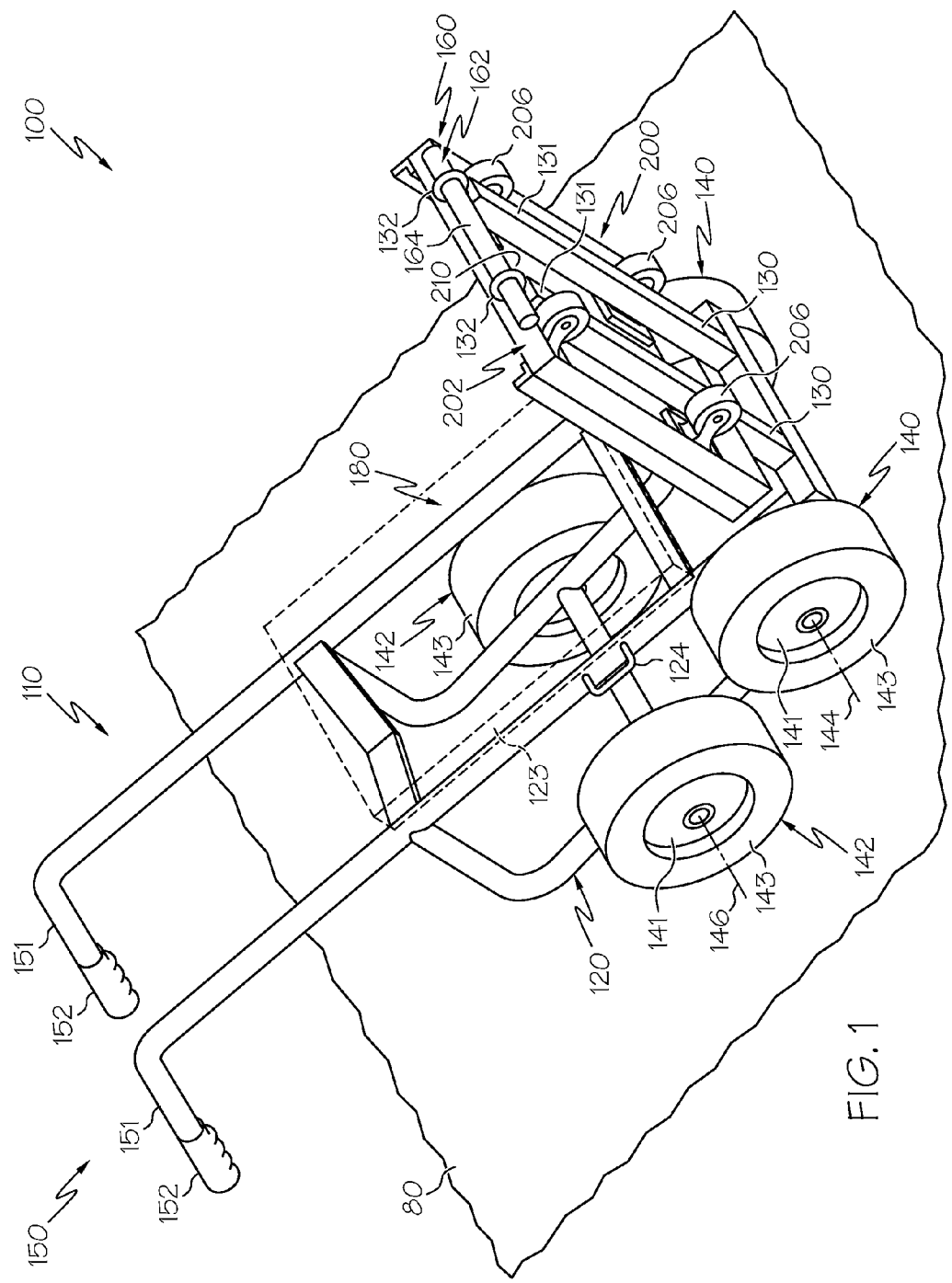
FIG. 1 depicts a perspective representation of a dolly transport system according to one or more embodiments shown and described herein.

Referring now to FIG. 1, one embodiment of a dolly transport system 100 is depicted. The dolly transport system 100 includes a dolly cart assembly 110 that includes a dolly frame 120 having a first supporting location 150, a second supporting location 160, and a load supporting region 180 located between the first supporting location 150 and the second supporting location 160. Lifting forks 130 may extend outward from the dolly frame 120. The lifting forks 130 and the dolly frame 120 may form at least part of the load supporting region 180 of the dolly cart assembly 110 onto which an object may be placed and supported.

The dolly cart assembly 110 may include a first wheel set 140 disposed along the dolly frame 120 at a location proximate to the lifting forks 130. The dolly cart assembly 110 may also include a second wheel set 142 disposed along the dolly frame 120 at a location away from the lifting forks 130. The first wheel set 140 and the second wheel set 142 may be coupled to the dolly frame 120 such that the first wheel set 140 and the second wheel set 142 are free to pivot about a first wheel set pivot axis 144 and a second wheel set pivot axis 146, respectively. For example, the first wheel set 140 and the second wheel set 142 may be coupled to the dolly frame 120 through an axle that passes through, or is attached to, opposing sides of the dolly frame 120.

The first wheel set 140 and the second wheel set 142 may include wheels 141 including a rigid tread portion, for example, rigid rubber wheels, or a compliant tread and/or sidewall portions, for example, pneumatic tires 143. A first wheel set 140 and a second wheel set 142 that include pneumatic tires 143 may allow for those compliant surfaces of the tread and/or sidewall portions to deform when an object is placed in the load supporting region 180 of the dolly cart assembly 110.

The first supporting location 150 of the dolly cart assembly 110 may be at a location along the dolly frame 120 furthest from the lifting forks 130. The first supporting location 150 may include at least one gripping handle 152 (e.g., two or more gripping handles 152) located at an upper end 151 of the dolly frame 120 opposite the lifting forks 130. The first supporting location 150 may be adapted for manual gripping by a first user using the gripping handles 152, such that the first user can apply a force to the dolly cart assembly 110, and therefore the dolly transport system 100, to manipulate the dolly transport system 100 together with an object being transported.

The second supporting location 160 of the dolly cart assembly 110 may be located proximate the lifting forks 130. The second supporting location 160 may include a handle grip structure 162 that is coupled to a grip receiving structure 132 located at a distal end 131 of the lifting forks 130. As depicted in FIG. 1, the grip receiving structure 132 may include a series of eye-bolts arranged near the distal ends 131 of the lifting forks 130. The grip receiving structure 132 may be fixedly attached or removable from the distal ends 131 of the lifting forks 130. The handle grip structure 162 may include an assist rod 164 that may be inserted into the openings of the eye-bolts as to couple the assist rod 164 with the grip receiving structure 132. In other embodiments, the grip receiving structure 132 may include spring loaded or manually actuated clamps that may be actuated to engage the assist rod 164 with the lifting forks 130. In another embodiment, the assist rod 164 may be inserted through openings in the lifting forks 130. The second supporting location 160 may be adapted for manual gripping by a second user, such that the second user may apply a force to the dolly cart assembly 110, and therefore the dolly transport system 100, at the lifting forks 130 to manipulate the dolly transport system 100 together with an object being transported.

The dolly cart assembly 110 may also include a cushion 123 coupled to the dolly frame 120 in a location proximate to the load supporting region 180. The cushion 123 may be made from a variety of compliant materials, including, for example, open cell or closed cell foam or rubber. The cushion 123 may prevent an object from coming into direct contact with the dolly frame 120, which may reduce the likelihood of damage to an object due to, for example, abrasion or impact.

The dolly cart assembly 110 may also include attachment members 124 located on different sides of the dolly frame 120. As will be described in reference to FIGS. 5 and 6, the attachment members 124 may be used in conjunction with a retention strap 170 to secure an object to the load supporting region 180 of the dolly cart assembly 110.

Figure 2:
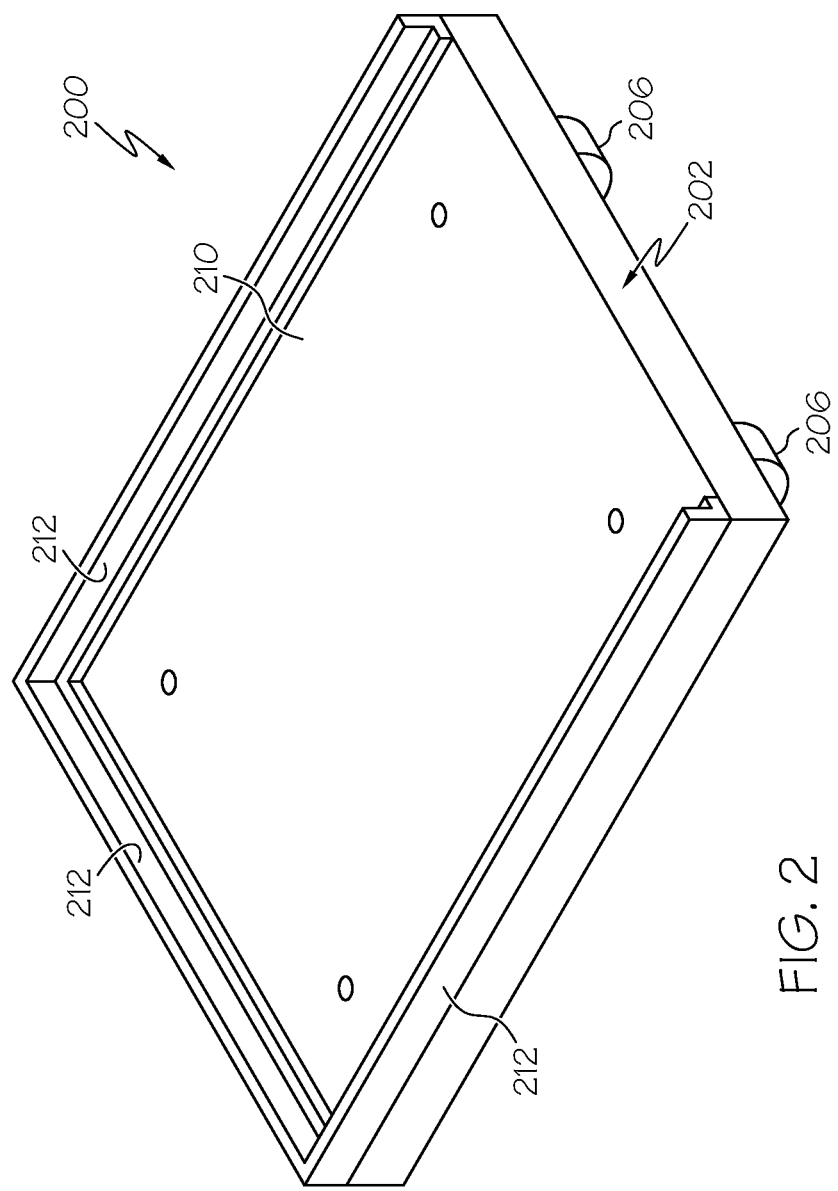
FIG. 2 depicts a perspective representation of a support platform for a dolly transport system according to one or more embodiments shown and described herein.

Referring to FIGS. 1 and 2, the dolly transport system 100 may also include a support platform 200 that is adapted to support an object being moved. As depicted in FIG. 1, the support platform 200 is shown positioned between the lifting forks 130 and the load supporting region 180 while the dolly cart assembly 110 is positioned in an inclined orientation. The support platform 200 may include a platform frame 202 and a plurality of casters 206 that extend from an underside of the platform frame 202. When the support platform 200 is not supported by the dolly transport system 100, the casters 206 may support the support platform 200 against a ground surface 80.

The platform frame 202 of the support platform 200 may include a support platform tray 210 and retention lips 212 that extend upwards from the support platform tray 210. Referring again to FIG. 1, when an object being moved is positioned along the support platform 200, one or more retention lips 212 are positioned around an object, forming a loading envelope inside which an object being moved may be at least partially held captive.

The grip receiving structure 132 (e.g., the eye-bolts) arranged near the distal ends 131 of the lifting forks 130 may extend outwardly away from the dolly frame 120 so as to extend at least partially beyond a length of the platform frame 202. Such an arrangement is shown by FIG. 1 depicting ends of the eye-bolts of the grip receiving structure 132 located beyond a leading edge of the platform frame 202. Exposing the grip receiving structure 132 beyond the length of the platform frame 202 may also expose the assist rod 164 of the handle grip structure 162 adjacent to the platform frame 202. In some embodiments, a length of the assist rod 164 measured along the long axis of the assist rod 164 may be greater than a width of the platform frame 202. Thus, when the assist rod 164 is coupled to the grip receiving structure 132 arranged along the distal ends 131 of the lifting forks 130, at least a portion of the assist rod 164 may extend beyond the support platform 200 in the widthwise direction, when evaluated when the dolly cart assembly 110 is positioned in an upright orientation. In other embodiments, the length of the assist rod 164 may be less than a width of the platform frame 202. In these embodiments, when the handle grip structure 162 is coupled to the grip receiving structure 132, ends of the assist rod 164 may not extend beyond the support platform 200 in the widthwise direction.

Figure 3:
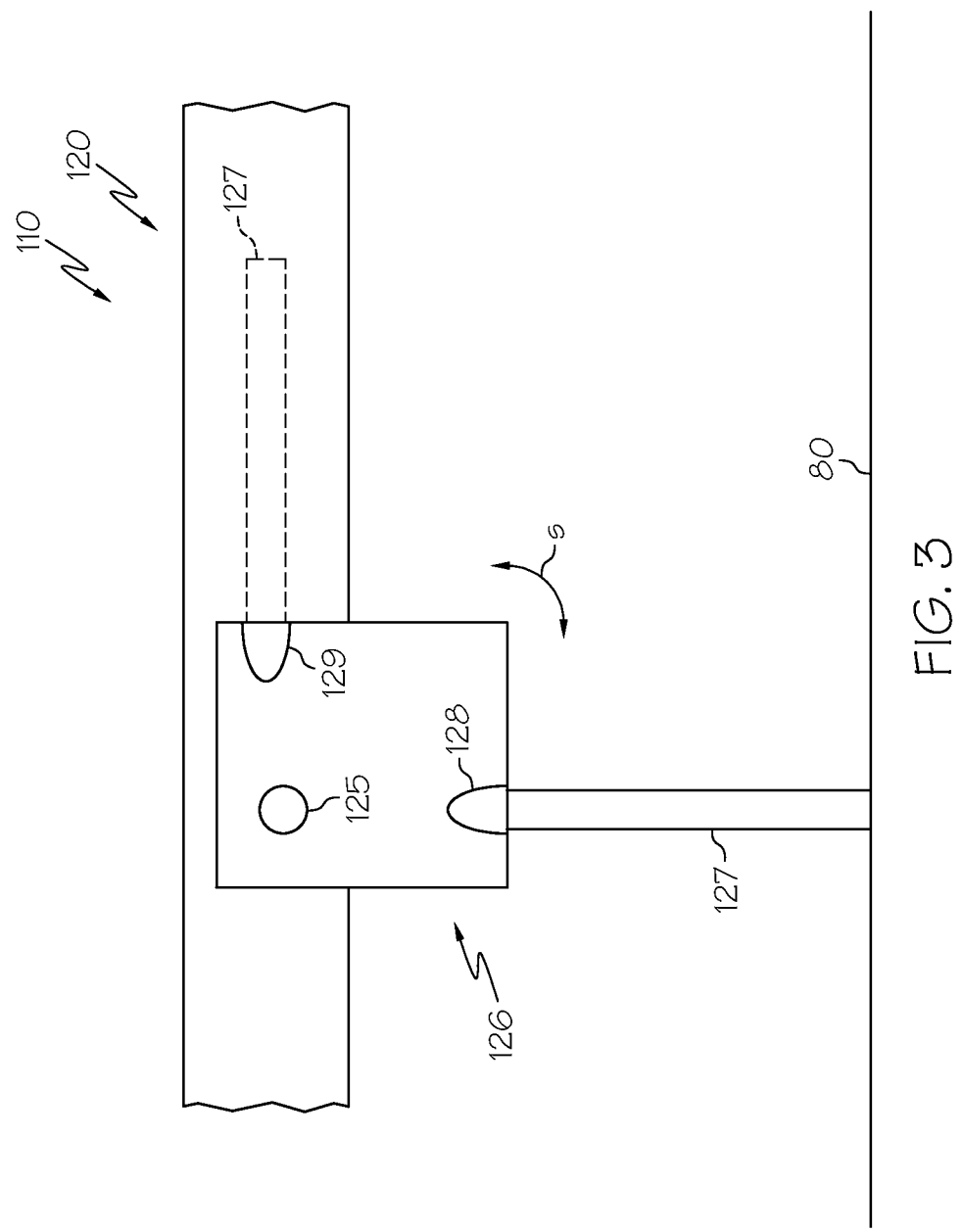
FIG. 3 depicts a rear view of a dolly transport system according to one or more embodiments shown and described herein.
Figure 4:
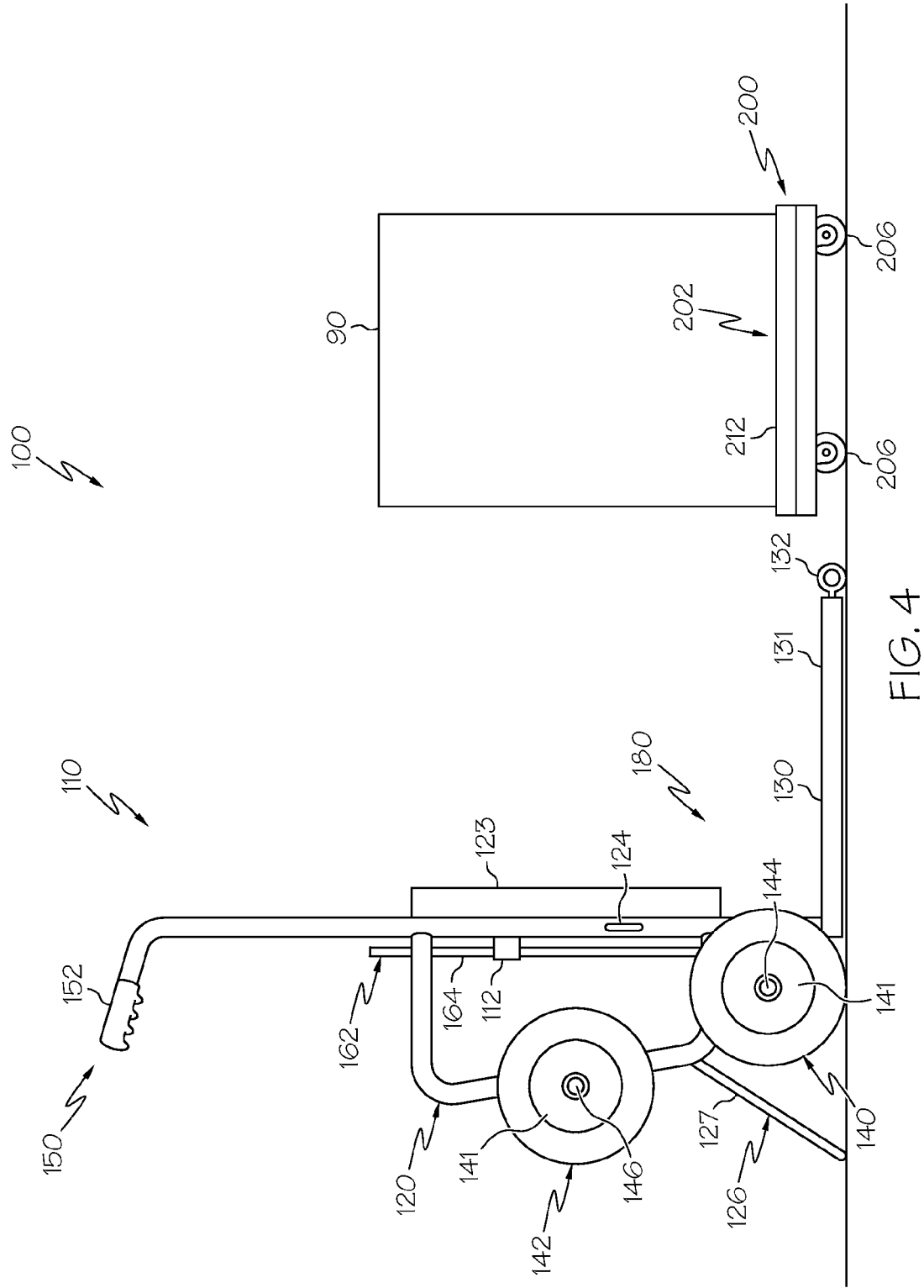
FIG. 4 depicts a perspective representation of a dolly transport system according to one or more embodiments shown and described herein.

Referring now to FIG. 3, the dolly transport system 100 may include a repositionable stand 126 that extends from a portion of the dolly frame 120 for supporting the dolly cart assembly 110 in an upright orientation (see FIG. 4). The repositionable stand 126 may include a support member 127 and a biasing member 125. The biasing member 125 may hold the support member 127 in one of a deployed position or a stowed position, i.e., moving in a direction along arrow S. The repositionable stand 126 may include a deployed position detent 128 corresponding to the support member 127 being located in the deployed position, and a stowed position detent 129 corresponding to the support member 127 being located in the stowed position. When the support member 127 is located in the deployed position, the repositionable stand 126 is configured and located to contact a ground surface 80. When the support member 127 is located in the stowed position, the repositionable stand 126 is configured and located to avoid contact with the ground surface 80.

Referring now to FIG. 4, the dolly cart assembly 110 may include a handle grip keeper 112 coupled to the dolly frame 120. The handle grip keeper 112 may be adapted to store the assist rod 164 when the assist rod 164 is not coupled with the grip receiving structure 132 located along the lifting forks 130. Thus, the handle grip keeper 112 is adapted to store the assist rod 164 spaced from the lifting forks 130 when the assist rod 164 is not coupled to the grip receiving structure 132. In one embodiment, the handle grip keeper 112 may include two circular openings that are generally concentric with one another, where the circular opening located proximate to the lifting forks 130 includes a lower bounding surface. The assist rod 164 may be positioned within the handle grip keeper 112 such that the assist rod 164 is inserted through both of the circular openings, and is therefore restrained axially and radially relative to the circular openings. Alternatively or in addition, the assist rod 164 may be secured to the dolly frame using attachment members, for example, clamps and/or straps.

The components of the dolly transport system 100 may be made from a variety of suitable materials, for example, steel, aluminum, or alloys thereof. The dolly frame 120 may be made from a generally tubular structure whose elements are bent and connected to one another to form the desired shape. Alternatively, or in addition, elements of the dolly frame 120 may be fabricated from sheet stock. Similarly, the lifting forks 130 may be fabricated from a variety of material stock forms, including tubular stock, channel stock, and/or sheet stock. Some embodiments of the dolly frame 120 and the lifting forks 130 may be fabricated from a polymeric material, for example, nylon, epoxy, or polyester. Some embodiments of the dolly frame 120 and the lifting forks 130 may include structural reinforcements, for example, oriented or chopped fibers.

Operation of the dolly transport system 100 will be discussed in reference to FIGS. 4-6. As depicted in FIG. 4, an object 90 may first be placed onto the support platform 200. The object 90 may be lifted and then lowered in an upright orientation, and placed on top of the platform frame 202 inside the loading envelope formed by the retention lips 212. The object 90 may be lifted and lowered using a variety of lift assist equipment (not shown) including, for example, overhead cranes or dedicated lift assist bars, that include coupling features that allow for attachment with the object 90.

With the object 90 placed on the support platform 200, the dolly cart assembly 110 may be positioned proximate to the object 90 and the support platform 200. The dolly cart assembly 110 may be placed in a freestanding, upright orientation (i.e., with the dolly frame 120 generally vertical and the lifting forks 130 generally horizontal). In this orientation, the first wheel set pivot axis 144 and the second wheel set pivot axis 146 may be located in different horizontal planes. The repositionable stand 126 may be placed in the deployed position as to support the dolly cart assembly 110 in the freestanding, upright orientation. Because the center of gravity of the dolly cart assembly 110 may be located rearward of the first wheel set 140 as compared to the lifting forks 130, the dolly cart assembly 110 may not stand in a freestanding, upright orientation without the additional support from the repositionable stand 126.

Figure 5:
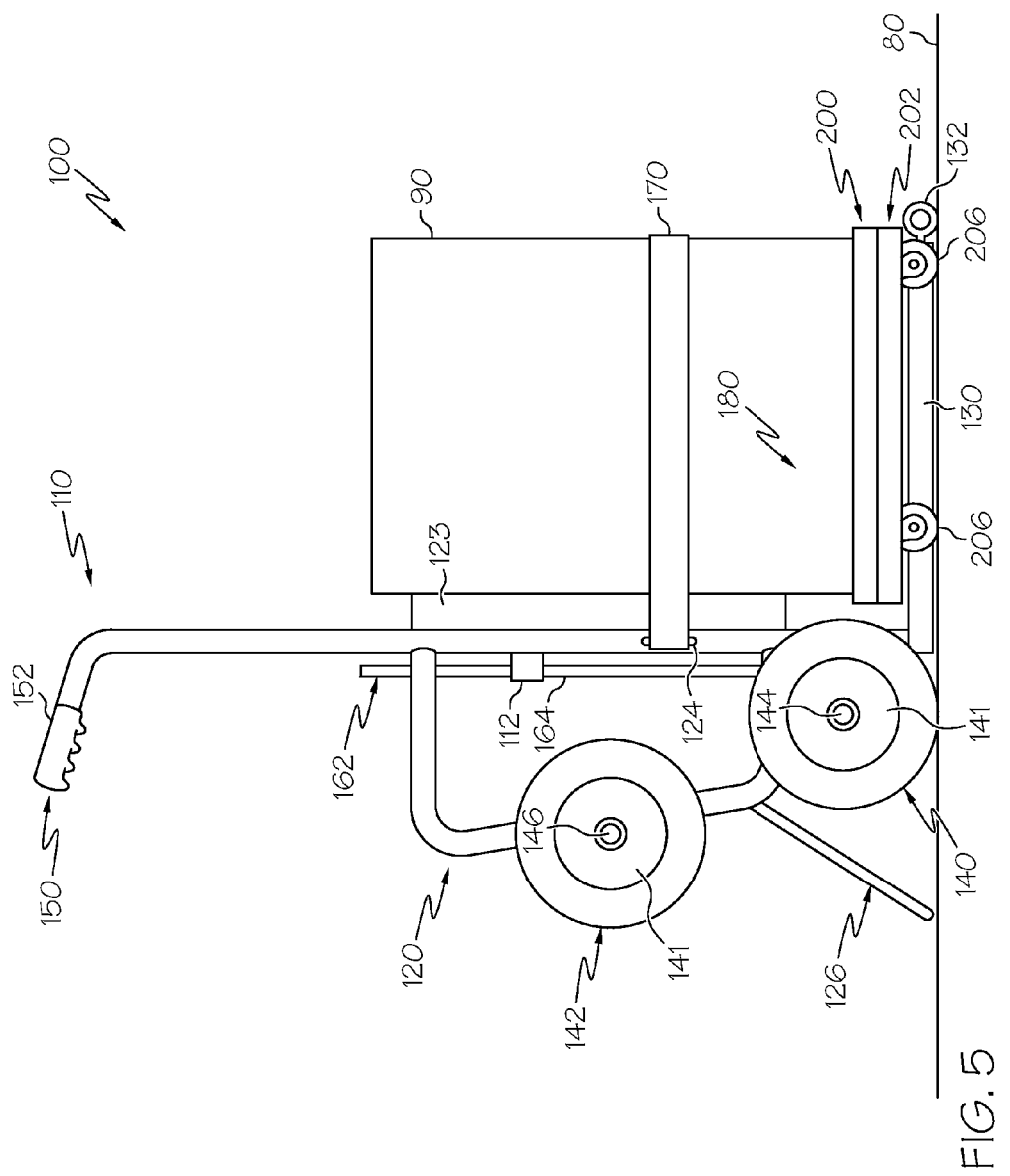
FIG. 5 depicts a perspective representation of a dolly transport system according to one or more embodiments shown and described herein.

Referring now to FIG. 5, the dolly cart assembly 110 and/or the support platform 200 may be shifted along the ground surface 80 towards one another until the support platform 200 reaches the maximum engagement depth relative to the dolly cart assembly 110. The lifting forks 130 and the grip receiving structure 132 located along the lifting forks 130 may slide beneath the platform frame 202 without contacting the platform frame 202. Additionally, the lifting forks 130 extending from the dolly frame 120 may be positioned widthwise to allow the lifting forks 130 and the grip receiving structure 132 to slide past the casters 206 without contacting the casters 206. In the embodiment depicted in FIG. 5, the maximum engagement depth of the support platform 200 relative to the dolly cart assembly 110 is reached when the object 90 contacts the cushion 123.

With the object 90 positioned within the load supporting region 180 of the dolly cart assembly 110, a retention strap 170 may be passed around the object 90 and the attachment members 124. The retention strap 170 may then be shortened in length to tighten the retention strap 170 against both the attachment members 124 and the object 90, as to provide additional security to at least partially hold the object 90 to the load supporting region 180 of the dolly cart assembly 110. The length of the retention strap 170 may be adjusted using a tightening mechanism, for example a ratchet mechanism or a cam mechanism. Alternatively or additionally, the length of the retention strap 170 may be adjusted, for example using slides, rings, loops, or clasps that allow for manual adjustment of the length of the retention strap 170.

The retention strap 170 may be tightened against the object 90 and the attachment members 124 to at least partially secure the object 90 at the load supporting region 180 of the dolly cart assembly 110. The retention strap 170 may be tightened by shortening the length of the retention strap 170 until a desired tension along the retention strap 170 is reached, or until a desired compression of the cushion 123 is reached, thereby ensuring the securing of the object 90 within the load supporting region 180 of the dolly cart assembly 110.

With the object 90 at least partially secured within the load supporting region 180 of the dolly cart assembly 110 by the retention strap 170, the center of gravity of the dolly transport system 100 may be positioned such that dolly cart assembly 110, and therefore the dolly transport system 100, will stand in a free-standing, upright orientation without support from the repositionable stand 126. Because the dolly transport system 100 is able to stand upright, the repositionable stand 126 may be placed into a stowed position, such that the repositionable stand 126 will avoid contact with the ground surface 80. In addition, the assist rod 164, which has been stored along the dolly cart assembly 110 in the handle grip keeper 112 and away from the grip receiving structure 132, may be removed from the handle grip keeper 112 for placement in the grip receiving structure 132.

Figure 6:
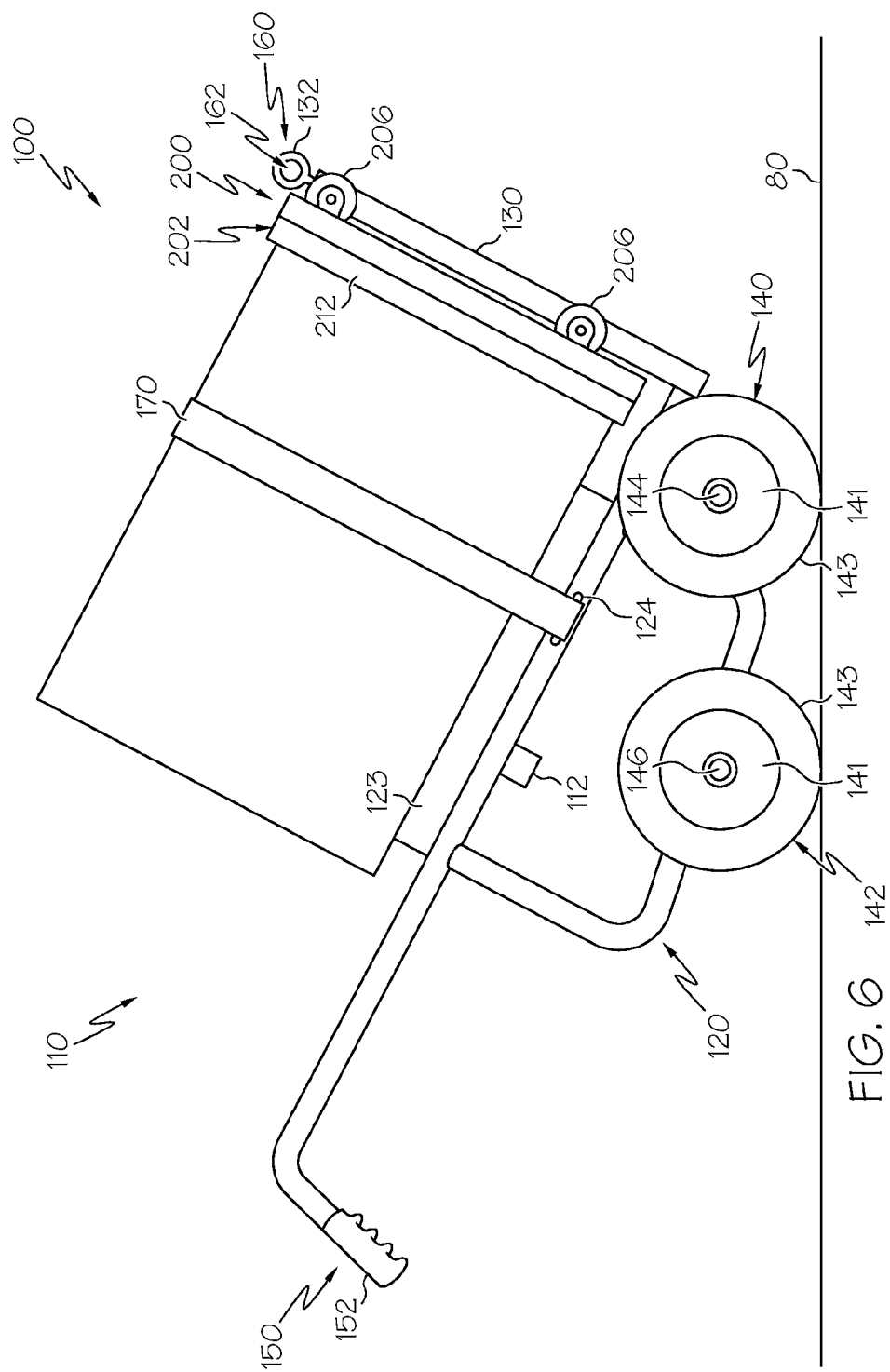
FIG. 6 depicts a perspective representation of a dolly transport system according to one or more embodiments shown and described herein.

Referring now to FIG. 6, a first user may manually grip the dolly cart assembly 110 at the gripping handles 152 of the first supporting location 150 as to pivot the dolly cart assembly 110, and therefore the dolly transport system 100, about the first wheel set 140 from an upright orientation into an inclined orientation. As depicted in FIG. 6, the center of gravity of the dolly cart assembly 110 along with the object 90 may be located such that the dolly cart assembly 110 is supported by the first wheel set 140 and the second wheel set 142 in a free-standing, inclined orientation. In this orientation, the first wheel set pivot axis 144 and the second wheel set pivot axis 146 may be located in the same horizontal plane. Alternately or in addition, in this orientation, the first wheel set 140 and the second wheel set 142 may contact the ground surface 80 in the same horizontal plane. With the weight of the object 90 supported by the first wheel set 140 and the second wheel set 142, the first wheel set 140 and the second wheel set 142 distribute the load associated with the object 90 to the ground surface 80. For embodiments of the dolly cart assembly 110 including pneumatic tires 143, compliant surfaces of the pneumatic tires 143 may deform to distribute the load associated with the object 90 over a contact area of the pneumatic tires 143.

With the dolly cart assembly 110 in the inclined orientation, the handle grip structure 162 including the assist rod 164 may be coupled with the grip receiving structure 132, thereby allowing a second user to manually grip the second supporting location 160 at the lifting forks 130. The first user, manually gripping the first supporting location 150, and the second user may cooperate to apply directional forces to the dolly transport system 100 at opposite ends of the dolly cart assembly 110 to manipulate the dolly transport system 100 and the object 90 into a desired location.

The first user and the second user may be able to apply force to the dolly transport system 100 as to manipulate the dolly transport system 100 to negotiate obstacles along the path of travel of the dolly transport system 100. In one example, the path of travel of the dolly transport system 100 may require negotiating over a threshold of a door. In another example, the path of travel of the dolly transport system 100 may require negotiating over a set of stairs. The first user and the second user may work together to apply force to opposite sides of the dolly transport system 100 as to lift the first wheel set 140 and the second wheel set 142 off of the ground surface 80 to avoid jarring contact with the obstacles, and as to minimize any potential damage to the object 90, for example, due to abrasion and/or impact. By including a first supporting location 150 and a second supporting location 160 along the dolly frame 120, the dolly transport system 100 allows a first and second user to apply force that directs the movement of the object 90 without having to apply the force directly to the object 90.

A first wheel set 140 and a second wheel set 142 having compliant surfaces as part of the pneumatic tires 143 may be used in applications in which the dolly transport system 100 is used to move an object 90 along a ground surface 80 that may be damaged by a concentrated load, for example, a membrane roof surface. Further, a first wheel set 140 and a second wheel set 142 that include compliant surfaces may improve the ride for the object 90 carried by the dolly transport system 100 by reducing harshness of the ride due to imperfections in a ground surface 80, for example, bumps and unevenness. A first wheel set 140 and a second wheel set 142 that include compliant surfaces, for example wheel sets that incorporate pneumatic tires 143, may minimize the transfer of these imperfections to the dolly cart assembly 110, and therefore the object 90 that is being moved by the dolly transport system 100.

It should now be understood that dolly transport systems according to the present disclosure allow multiple users to direct the movement of objects supported by the dolly transport systems. By allowing two users to manipulate the movement of the dolly transport systems, the users may be able to better negotiate obstacles along the path of travel. Further, the dolly transport systems according to the present disclosure may allow the object to be transported in a stable, supported orientation without requiring a user constantly apply a force to maintain that orientation.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A dolly transport system comprising:
    a dolly cart assembly comprising:
        a dolly frame including at least one gripping handle;
        at least one lifting fork extending from the dolly frame to a distal end, the lifting fork comprising a grip receiving structure located at the distal end of the lifting fork and spaced apart from the at least one gripping handle; and
        a handle grip structure located at the distal end of the lifting fork, the handle grip structure comprising an assist rod that is removably coupled to the grip receiving structure;
    wherein the dolly cart assembly includes a first supporting location including the gripping handle and a second supporting location remote from the first supporting location including the handle grip structure.

2. The dolly transport system of claim 1 further comprising a first wheel set located along the dolly frame and a second wheel set located along the dolly frame, wherein the first wheel set and the second wheel set contact a ground surface to support the dolly cart assembly in a free-standing, inclined orientation.

3. The dolly transport system of claim 2, wherein:
    the first wheel set has a first wheel set pivot axis about which the first wheel set pivots;
    the second wheel set has a second wheel set pivot axis about which the second wheel set pivots;
    when the dolly frame is in the free-standing, inclined orientation, the first wheel set pivot axis and the second wheel set pivot axis are located in the same horizontal plane; and
    when the dolly frame is in a free-standing, upright orientation, the first wheel set pivot axis and the second wheel set pivot axis are located in different horizontal planes.

4. The dolly transport system of claim 2, wherein the first wheel set and the second wheel set comprise pneumatic tires having compliant surfaces that deform to distribute a load carried by the dolly cart assembly.

5. The dolly transport system of claim 1 further comprising a support platform adapted to support an object in a free-standing, upright orientation, the support platform comprising a platform frame and a plurality of casters extending from an underside of the platform frame, such that the lifting fork slides beneath the platform frame without contacting the platform frame.

6. The dolly transport system of claim 5, wherein the platform frame comprises a support platform tray and at least one retention lip extending upwards from the support platform tray.

7. The dolly transport system of claim 5, wherein at least a portion of the handle grip structure is located beyond the platform frame of the support platform when the dolly frame is positioned in the free-standing, upright orientation.

8. The dolly transport system of claim 5, wherein a length of the assist rod measured along the long axis of the assist rod is greater than a width of the platform frame in the long axis direction of the assist rod.

9. The dolly transport system of claim 1, wherein the dolly cart assembly further comprises a repositionable stand adapted to contact a ground surface in a deployed position to support the dolly frame in a free-standing, upright orientation.

10. The dolly transport system of claim 1 further comprising a retention strap coupled to the dolly frame as to at least partially secure an object to the dolly frame.

11. The dolly transport system of claim 1, wherein the dolly cart assembly further comprises a cushion coupled to the dolly frame, wherein the cushion is located between an object and the dolly frame.

12. The dolly transport system of claim 1, wherein the grip receiving structure comprises at least one opening through the at least one lifting fork.

13. The dolly transport system of claim 1, wherein the grip receiving structure comprises eye-bolts arranged proximate to the distal ends of the at least one lifting fork.

14. A dolly transport system comprising:
    a dolly cart assembly comprising:
        a dolly frame including at least one gripping handle;
        at least one lifting fork extending from the dolly frame to a distal end;
        a grip receiving structure located at the distal end of the lifting fork and spaced apart from the at least one gripping handle; and
        a handle grip structure having an assist rod coupled to the grip receiving structure, wherein the assist rod is removable from the grip receiving structure;
        a first wheel set located along the dolly frame, the first wheel set having a first wheel set pivot axis about which the first wheel set pivots; and
        a second wheel set located along the dolly frame, the second wheel set having a second wheel set pivot axis about which the first wheel set pivots;

wherein the first wheel set and the second wheel set contact a ground surface to support the dolly frame in a free-standing, inclined orientation, and the first wheel set pivot axis and the second wheel set pivot axis are located in different horizontal planes when the dolly frame is in a free-standing, upright orientation.

15. The dolly transport system of claim 14 further comprising a support platform adapted to support an object in a free-standing, upright orientation, the support platform comprising a platform frame and a plurality of casters extending from an underside of the platform frame.

16. A dolly transport system comprising:
    a dolly cart assembly comprising:
        a dolly frame including at least one gripping handle;
        at least one lifting fork extending from the dolly frame to a distal end and spaced apart from the at least one gripping handle;
        a grip receiving structure located at the distal end of the lifting fork; and
        a handle grip structure having an assist rod removably coupled to the grip receiving structure.

17. The dolly transport system of claim 16, wherein the dolly cart assembly further comprises a first wheel set located along the dolly frame and a second wheel set located along the dolly frame, wherein the first wheel set and the second wheel set contact a ground surface to support the dolly frame in a free-standing, inclined orientation.

18. The dolly transport system of claim 17, wherein:
    the first wheel set has a first wheel set pivot axis about which the first wheel set pivots;
    the second wheel set has a second wheel set pivot axis about which the second wheel set pivots; and
    when the dolly frame is in a free-standing, upright orientation, the first wheel set pivot axis and the second wheel set pivot axis are located in different horizontal planes.

19. The dolly transport system of claim 16 further comprising a support platform adapted to support an object in a free-standing, upright orientation, the support platform comprising a platform frame and a plurality of casters extending from an underside of the platform frame.

20. The dolly transport system of claim 19, wherein a length of the assist rod measured along the long axis of the assist rod is greater than a width of the platform frame in the long axis direction of the assist rod.

\* \* \* \* \*